Figure 1:
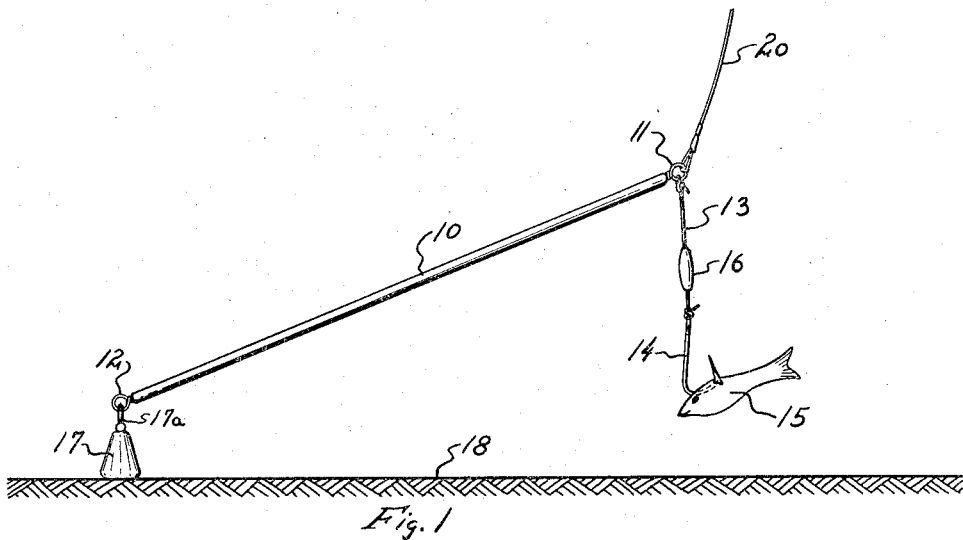

Nov. 26, 1957     E. J. KNAPTON     2,814,151

FISHING APPARATUS

Filed Oct. 8, 1953

INVENTOR
EARL J. KNAPTON
BY Williamson, Williamson,
Schroeder & Adams
ATTORNEYS

United States Patent Office 2,814,151
Patented Nov. 26, 1957

2,814,151

FISHING APPARATUS

Earl J. Knapton, Bemidji, Minn.

Application October 8, 1953, Serial No. 384,915

2 Claims. (Cl. 43—43.15)

This invention relates to fishing apparatus and more particularly to a depth gauging device for maintaining a fishing hook and bait in close spaced relation with the bottom of a body of water such as a lake irrespective of the depth of water thereover.

Numerous devices have been proposed for maintaining fishing bait above the bottom of a body of water, the commonness of which is a type of sinker which will follow the bottom while permitting bait such as live minnows to trail therebehind and in close proximity to the bottom without necessarily dragging therealong. Another type of similar device provides a weight member which will sink to the bottom and permit a sliding float to rise to a predetermined height, the sliding float having secured thereto the fishing leader, hook, and bait. Other devices which are operable from a float adapted to be maintained at the surface of the water require preadjusting of the fish line by the fisherman so that the bait will attain a depth measured from the surface of the water rather than from the bottom thereof. Such devices, of course, can only be used for bottom fishing where the fisherman has knowledge of the depth of water in which he is fishing.

The present invention is concerned with spacing bait at a predetermined distance from the bottom irrespective of the depth of water thereover. Certain fish, such as walleyed pike, bass, perch and sunfish, generally feed close to the bottom of the body of water and hence are more apt to be caught if the bait can be maintained in this area. In addition to the predetermined spacing, I provide for simultaneous coverage of an area which the bait will randomly cover over a period of time. The coverage of an area rather than a fixed position of the bait will obviously increase the likelihood of fish discovering the bait and becoming hooked.

It is therefore an important object of this invention to provide fishing apparatus which will increase the likelihood of catching fish by permitting bait to be randomly positioned within a restricted area at a predetermined spaced distance above the bottom of the body of water.

It is another object of the invention to provide a simple and convenient device which will maintain fishing bait at a predetermined distance above the bottom of a body of water while at the same time permitting the bait to cover a limited area at the bottom without becoming entangled in the apparatus and without frightening away the fish which may be in the vicinity.

It is a further object of the invention to provide a device of the class described in which a sensitive and positive communication may be provided for hooking and retrieving a fish, yet permitting the bait freedom of movement before the fish is hooked.

More specifically, it is an object of the invention to provide a weight with a sunken float member swingable in an area therearound, the weight member overcoming the buoyant effect of the float, and the upper end of which float provides means for spacing a leader and hook arrangement above the bottom of the lake without permitting entangling of the various parts of the apparatus.

Figure 2:
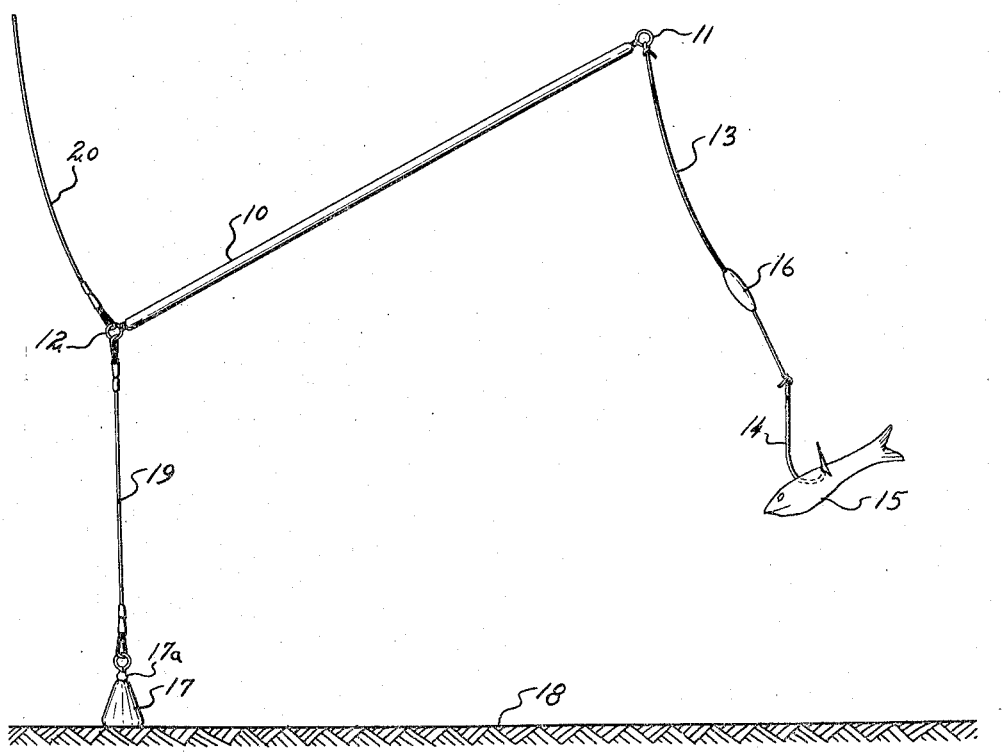

These and other objects and advantages of my invention will more fully appear from the following description made in connection with the accompanying drawings wherein like reference charcters refer to similar parts throughout the several views and in which:

Fig. 1 is a side elevation of one form of my fishing apparatus, the weight member being in contact with the bottom of a lake and the spacing float in angular relation thereto under the influence of the buoyant effect of the water; and Fig. 2 is an alternate arrangement of my invention showing an interconnection of predetermined length between the weight member and the spacing float, the fishing line being attached to the lower end of the spacing float member.

Referring now more particularly to the drawing, my invention comprises a spacing float member 10 which is stiff and elongated and normally disposed in an upwardly angulated position as shown. The spacing float is preferably constructed of wood but may be made of other material having an air space within so as to have an overall density less than that of the water within which it is adapted to lie. It is preferred that the spacing float be painted or colored a drab color such as brown or green which will blend into the marine foliage and debris usually present at the bottom of bodies of water such as a lake. I have found that a wooden spacing member painted a drab olive or dark green color will be completely ignored by fish in the vicinity thereof, the spacing member having the appearance of a sunken twig or weed.

The spacing float is provided with fastening means adjacent each end, the means preferably comprising an eye hook 11 at the upper end thereof and a similar eye hook 12 disposed at the lower end of said spacing float. The fastening means 11 and 12 should be rigidly formed since either one of the fastening means may provide an interconnection between the fish hook and fish line as will be presently described, and consequently the full force exerted by a fish thereon must be accounted for. The upper fastening means or eye hook 11 is adapted to have fastened thereto a flexible line such as the leader 13, the leader 13 terminating in a hook 14 to which may be attached fish bait such as live minnow 15. A small weight or sinker 16 may be employed in connection with the leader if desired to limit the activity of the bait 15. The smaller the sinker 16, the more latitude will be given the leader and consequently the greater area encompassed by the bait during the fishing operation.

The lower end of the elongated spacing float is secured to a weight 17 through fastening means 12, the spacing float 10 being permitted to lie in upwardly angulated manner as previously pointed out. The weight 17 is selected so as to provide a downwardly directed weight in water which exceeds the net buoyant force of the spacing float 10 and will thereby at all times maintain contact with the lake bottom 18 while permitting the spacing float to angulate upwardly as shown. It is preferred that the interconnection 17a between the weight 17 and the fastening means at the lower end of the spacing float 10 be of such a nature as to permit swiveling of the spacing float in all directions. The bait 15 will thus be permitted to cover a circular area surrounding the weight 17 while being maintained at a predetermined distance above lake bottom 18 at all times.

It is to be noted that the combined length of the leader 13 and hook 14 is substantially less than that of the elongated spacing float 10 so that there is no danger of the hook or leader becoming entrangled in the interconnection between the fastening means 12 and the weight 17 or in other portions of the device which may be secured at, or in association with, the lower end of the spacing float.

In the alternate arrangement shown in Fig. 2, the spacing float 10 is identical with that shown in Fig. 1 and the lever 13 and hook 14 may likewise be identical, the overall length thereof being maintained substantially less than the total length of the spacing float 10. The fastening means 11 and 12 may likewise be identical and the weight 17 supplying a swivel connection 17a with the float 10 and, as above, providing a weight sufficient to overcome the buoyant effect of the float member.

The interconnection, however, between the weight 17 and the fastening means 12 provides a predetermined length for adjusting the distance of the spacing float 10 above the lake bottom 18 and hence to adjust the spacing between lake bottom 18 and the bait 15. The interconnecting means may comprise the flexible line 19 which will permit twisting or swiveling movement of the float 10 in a circular area as previously described.

In the form of the invention shown in Fig. 1, a fish line 20 extending from a pole or gear (not shown) may be attached to either of the fastening means 11 or 12. It is understood, of course, that the line may be attached at the swivel 17a but is preferably secured to the eye hook 11 as shown. In such an arrangement, the slightest movement of the hook 14 under the influence of a fish which is attacking the bait 15 will be immediately felt or observed by the fisherman. On the other hand, if the fish line 20 is secured to the lower of the fastening means as shown in Fig. 2, the sensitivity of the arrangement may be reduced somewhat. The latter arrangement, however, may be a distinct advantage where it is desired to give the fish an opportunity to "run" with the bait before setting the hook. Furthermore, the spacing float 10 will not be a wide appendage in the later arrangement since it will constitute a portion of the line of pull while retrieving a fish.

In either arrangement, as shown in Fig. 1 or Fig. 2, and with any of the connections with the fishline above described, it will be noted the upwardly angulated spacing float will prevent the leader and hook from entangling with the interconnecting line 19 or other parts of the arrangement while still permitting a considerable area of the lake bottom to be randomly covered by bait 15, the bait being spaced a predetermined distance above the lake bottom to increase the likelihood of encountering and luring fish to the bait.

It will, of course, be understood that various changes may be made in the form, details, arrangement and proportions of the parts without departing from the scope of my invention.

What I claim is:

1. Fishing apparatus comprising, a straightly enlongated substantially rigid body constructed of material resistant to water and having sufficient buoyancy to float, one end of said body constituting an anchoring end and the other a free swinging end, and anchoring weight member swingably secured to the anchoring end of the body and having sufficient mass to overcome the floating tendency of the body, and a limp and flexible line shorter than said elongated stiff body and terminating in a fishing lure secured to the free end of the buoyant body, said line and lure having a weight sufficient to partially overcome the buoyant effect of the free end of said body whereby the elongated body will be maintained under water at an upwardly and outwardly angulated position freely swingable about the anchoring weight with the free end thereof maintaining said fish lure in freely suspended and non-tangling relation within a circular path defined around said anchoring weight.

2. The subject matter set forth in claim 1 and a fishline having means at an end thereof fastening said line to one of the ends of said body.

References Cited in the file of this patent

UNITED STATES PATENTS

| | | |
|---|---|---|
| 1,702,417 | Sanbo | Feb. 19, 1929 |
| 1,782,010 | Meyer | Nov. 18, 1930 |
| 1,980,302 | Taylor | Nov. 13, 1934 |
| 1,991,253 | Kerns | Feb. 12, 1935 |
| 2,157,819 | Eckert | May 9, 1939 |
| 2,289,663 | Linhares | July 14, 1942 |
| 2,421,466 | Schenavar | June 3, 1947 |
| 2,551,998 | De Groot | May 8, 1951 |
| 2,710,480 | Gehrig | June 14, 1955 |